United States Patent
Azure et al.

(10) Patent No.: US 12,146,287 B2
(45) Date of Patent: Nov. 19, 2024

(54) COMPACT UTILITY LOADER WITH LOAD-SENSING VARIABLE LENGTH LIFT ARM ASSEMBLY

(71) Applicant: THE TORO COMPANY, Bloomington, MN (US)

(72) Inventors: John P. Azure, Bloomington, MN (US); Jeffrey R. Frank, Bloomington, MN (US); David A. Murray, Eagan, MN (US)

(73) Assignee: THE TORO COMPANY, Bloomington, MN (US)

(*) Notice: Subject to any disclaimer, the term of this patent is extended or adjusted under 35 U.S.C. 154(b) by 574 days.

(21) Appl. No.: 17/474,493

(22) Filed: Sep. 14, 2021

(65) Prior Publication Data
US 2022/0098820 A1 Mar. 31, 2022

Related U.S. Application Data

(60) Provisional application No. 63/083,253, filed on Sep. 25, 2020.

(51) Int. Cl.
*E02F 3/34* (2006.01)
*B62D 51/02* (2006.01)
(Continued)

(52) U.S. Cl.
CPC ............ *E02F 3/3402* (2013.01); *B62D 51/02* (2013.01); *B62D 55/06* (2013.01); *E02F 3/422* (2013.01);
(Continued)

(58) Field of Classification Search
CPC ....... B62D 51/02; B62D 51/06; E02F 3/3402; E02F 3/422; D02F 9/2228; D02F 9/226; D02F 9/2267
See application file for complete search history.

(56) References Cited

U.S. PATENT DOCUMENTS

| | | | | |
|---|---|---|---|---|
| 2,990,072 A | * | 6/1961 | Mindrum | E02F 3/3402 414/718 |
| 3,178,046 A | * | 4/1965 | Lull | B66F 9/0655 414/718 |

(Continued)

FOREIGN PATENT DOCUMENTS

| | | |
|---|---|---|
| CN | 203247619 U | 10/2013 |
| FR | 2522636 A1 | 9/1983 |

(Continued)

OTHER PUBLICATIONS

Azure et al., U.S. Appl. No. 63/083,253, filed Sep. 25, 2020.
(Continued)

*Primary Examiner* — Saul Rodriguez
*Assistant Examiner* — Brendan P Tighe
(74) *Attorney, Agent, or Firm* — Mueting Raasch Group

(57) ABSTRACT

A compact utility loader incorporating a boom of adjustable length. The boom may include one or more lift arm assemblies, with each lift arm assembly including a first lift arm that telescopically receives a second lift arm. Each lift arm assembly also includes a telescoping actuator adapted to telescopically extend and retract its second lift arm relative to its first lift arm. A load-sensing system may be provided and adapted to limit lift arm assembly extension based at least in part upon a tool load applied at a tool supported by the boom.

14 Claims, 6 Drawing Sheets

(51) Int. Cl.
  *B62D 55/06* (2006.01)
  *E02F 3/42* (2006.01)
  *E02F 9/22* (2006.01)
(52) U.S. Cl.
  CPC ............ *E02F 9/2228* (2013.01); *E02F 9/226* (2013.01); *E02F 9/2267* (2013.01)

(56) References Cited

U.S. PATENT DOCUMENTS

| | | | |
|---|---|---|---|
| 4,082,197 A * | 4/1978 | Stedman | E02F 9/0841 |
| | | | 414/718 |
| 4,162,873 A | 7/1979 | Smith, Jr. | |
| 4,553,899 A | 11/1985 | Magni | |
| 4,645,264 A | 2/1987 | Morrison | |
| 5,423,654 A | 6/1995 | Rohrbaugh | |
| 5,542,814 A | 8/1996 | Ashcroft et al. | |
| 5,848,531 A * | 12/1998 | Nakamura | E02F 9/2235 |
| | | | 60/494 |
| 6,695,568 B2 | 2/2004 | Bares et al. | |
| 6,698,114 B2 | 3/2004 | Bares et al. | |
| 6,709,223 B2 | 3/2004 | Walto et al. | |
| 6,726,437 B2 | 4/2004 | Albright et al. | |
| 7,980,569 B2 | 7/2011 | Azure et al. | |
| 8,464,819 B2 | 6/2013 | Major et al. | |
| 8,965,637 B2 | 2/2015 | Brooks et al. | |
| 9,073,739 B2 | 7/2015 | Woods et al. | |
| 10,718,098 B1 | 7/2020 | Hager et al. | |
| 2010/0168933 A1 | 7/2010 | Rorabaugh | |
| 2013/0036728 A1 * | 2/2013 | Billaud | E02F 9/2292 |
| | | | 60/459 |
| 2016/0169413 A1 | 6/2016 | Camacho et al. | |
| 2016/0244937 A1 | 8/2016 | Azure et al. | |
| 2017/0101143 A1 | 4/2017 | Thomas et al. | |
| 2019/0359025 A1 * | 11/2019 | Wager | B60G 21/005 |

FOREIGN PATENT DOCUMENTS

| | | |
|---|---|---|
| GB | 2079246 A | 1/1982 |
| WO | 2022055856 A1 | 3/2022 |

OTHER PUBLICATIONS

Toro, "Toro Dingo TXL 2000," Compact Utility Loaders Product Brochure. The Toro Company. Copyright 2019; 2 pages.

"Earthmoving Machinery—Coupling of Attachments to Skid Steer Loaders SAE J2513." SAE Standard; Jun. 2000, 3 pages.

Toro "Toro Dingo Compact Utility Loaders," Product Brochure. The Toro Company [online]. [retrieved on Jan. 12, 2018]. Retrieved from the Internet: URL: toro.com/professional/sws/brochure/la_Dingo.pdf. Copyright 2008; 20 Pages.

Grayson, "This is Teleskid: Check out JCB's new half skid steer, half telehandler before its official ConExpo launch (video)" Equipment World [online]. [retrieved on Jan. 4, 2018]. Retrieved from the Internet: URL: equipmentworld.com/this-is-teleskid-check-out-jcbs-new-half-skid-steer-half-telehandler-before-its-official-conexpo-launch-video/. Feb. 21, 2017; 5 pages.

"Forklift | Forklift Truck | JCB Teletruk," web page [online]. [retrieved on Apr. 4, 2018] Retrieved from the Internet: URL: https://web.archive.org/web/20160316205956/http://www.jcbna.com/products/Machines/Teletruk.aspx. Mar. 16, 2016; 4 pages.

"JCB Skid Steer | Skid Steer Loader | JCB Skid Steer," web page [online]. [retrieved on Apr. 4, 2018]. Retrieved from the Internet: URL:https://web.archive.org/web/20160319034244/http://www.jcbna.com/products/Machines/Skid-Steer-Loader.aspx. Mar. 19, 2016; 5 pages.

"JCB Telescopic Handlers | JCB Telehandler | JCB Loadall," web page [online]. [retrieved on Apr. 4, 2018]. Retrieved from the Internet: URL:https://web.archive.org/web/20160317225850/http://www.jcbna.com:80/products/Machines/Telescopic-Handlers.aspx. Mar. 17, 2016; 5 pages.

Merlo Cingo, "CINGO Big Versatile Transporters," Product Brochure. Merlo S.p.A. Cuneo, Italy. Copyright 2009; 16 pages.

Toro "Toro Dingo Compact Utility Loaders, Toro Dingo TX Tracked Models," Partial Product Brochure. The Toro Company [online]. [retrieved on Jan. 12, 2018]. Retrieved from the Internet: URL: toro.com/professional/sws/brochure/la_Dingo.pdf. Copyright 2008; Cover Page and pp. 4-5.

Toro "Toro Dingo Compact Utility Loaders, Toro Dingo TX 413 and Trailer," Partial Product Brochure. The Toro Company [online]. [retrieved on Jan. 12, 2018]. Retrieved from the Internet: URL: toro.com/professional/sws/ brochure/la_Dingo.pdf. Copyright 2008; Cover Page and pp. 6-7.

Toro, "Partial Hydraulic Schematic, Toro Dingo TXL 2000 Telescoping Arm Compact Tool Carrier/Utility Loader (Model 22530 and 22531), " The Toro Company, Dec. 2018, 1 page.

Toro, "TXL 2000 Compact Tool Carrier," Hydraulic Schematic, Model No. 22530—Serial No. 400000000 and up; Model 22531—Serial No. 400000000 and up, Drawing No. 136-4857 Rev B, Form No. 3423-494 Rev C, The Toro Company, 2018, 1 page.

* cited by examiner

COMPACT UTILITY LOADER WITH LOAD-SENSING VARIABLE LENGTH LIFT ARM ASSEMBLY

This application claims priority to and/or the benefit of U.S. Provisional Patent Application No. 63/083,253, filed 25 Sep. 2020, which is incorporated herein by reference in its entirety.

Embodiments of the present disclosure relate to compact utility loaders and to such loaders having a load-sensing variable length lift arm assembly.

BACKGROUND

Compact utility loaders (such loaders being referred to herein as "CULs") are known for performing various types of work in indoor and outdoor environments.

Modern CULs are able to accept a variety of working tools that attach to a boom extending from a frame of the loader. The boom is typically formed by one or more lift arms that extend forward from the loader and include a mounting structure capable of receiving and supporting the attachment. The lift arms are typically pivotally attached to the loader and, via an actuator such as one or more hydraulic cylinders, may be pivoted relative to the loader such that the elevation of the attachment may be varied. With some CULs (see, e.g., U.S. Pat. No. 10,718,098), the lift arms may form telescoping assemblies that permit telescopic extension and retraction, allowing additional versatility in tool movement.

SUMMARY

CULs having variable length lift arms may produce a moment on the loader frame that varies as a function of the both the attachment (or tool) load and the degree of lift arm extension. Embodiments of the present disclosure may provide CUL systems and methods for estimating the tool load and automatically limiting lift arm extension when the tool load exceeds a threshold value. For example, in one embodiment, a compact utility loader is provided that includes a frame and ground-engaging members operatively attached to the frame. At least one of the ground-engaging members is powered to propel the frame over a surface. The loader also includes a lift arm assembly operatively attached to the frame, wherein the lift arm assembly has first and second lift arms telescopically engaged with one another, and wherein the lift arm assembly is pivotally attached to the frame at a lift arm pivot axis. The loader also includes: a hydraulic lift actuator adapted to pivot the lift arm assembly about the lift arm pivot axis, the lift actuator having an extension side and a retraction side; and a hydraulic telescoping actuator adapted to telescopically extend and retract the second lift arm relative to the first lift arm, wherein the telescoping actuator also includes an extension side and a retraction side. A differential pressure switch associated with the lift actuator is provided and is adapted to detect a threshold differential pressure between the extension side and the retraction side of the lift actuator.

In another embodiment, a compact utility loader is provided that includes a frame and ground-engaging members operatively attached to the frame. At least one of the ground-engaging members is powered to propel the frame over a surface. A control console is also provided and located at or near a rear end of the frame, the control console carrying controls adapted to be manipulated by an operator either: standing on a platform mounted near the rear end of the frame; or walking behind the frame. The loader also includes a lift arm assembly attached to at least one of a first and second side of the frame, wherein the lift arm assembly includes: an elongate rear lift arm including a front end and a rear end, wherein the rear end of the rear lift arm is pivotally attached to the frame at a lift arm pivot axis; and an elongate front lift arm also including a front end and a rear end, wherein the rear end of the front lift arm is telescopically received in the front end of the rear lift arm such that a distance between the rear end of the rear lift arm and the front end of the front lift arm is variable. The loader additionally includes: a hydraulic lift cylinder adapted to pivot the lift arm assembly about the lift arm pivot axis, the lift cylinder having an extension side and a retraction side; a hydraulic telescoping cylinder adapted to telescopically extend and retract the front lift arm relative to the rear lift arm; and a differential pressure switch associated with the lift cylinder and adapted to detect a threshold differential pressure between the extension side and the retraction side of the lift cylinder.

In still another embodiment, a compact utility loader is provided that includes a frame and ground-engaging members operatively attached to the frame. At least one of the ground-engaging members is powered to propel the frame over a surface. The loader also includes a lift arm assembly operatively attached to the frame, wherein the lift arm assembly includes first and second lift arms telescopically engaged with one another, and wherein the lift arm assembly is pivotally attached to the frame at a lift arm pivot axis. A hydraulic lift cylinder is provided and is adapted to pivot the lift arm assembly about the lift arm pivot axis, the lift cylinder including an extension side and a retraction side. Additionally, a hydraulic telescoping cylinder is provided and is adapted to telescopically extend and retract the front lift arm relative to the rear lift arm, wherein the telescoping cylinder also includes an extension side and a retraction side. The loader further includes: a differential pressure switch associated with the lift cylinder and adapted to detect a threshold differential pressure between the extension side and the retraction side of the lift cylinder; and a sequence valve connected to the retraction side of the lift cylinder, wherein the sequence valve has a first position in which hydraulic fluid in the retraction side of the lift cylinder is isolated from other hydraulic components of the loader.

In still yet another embodiment, a method of operating a compact utility loader is provided. The method includes lifting a tool attached to a lift arm assembly from a first elevation to a second elevation by providing pressurized hydraulic fluid to an extension side of a lift cylinder, wherein the lift arm assembly has first and second lift arms telescopically engaged with one another, and wherein a telescoping cylinder is adapted to adjust the length of the lift arm assembly by directing pressurized hydraulic fluid to either an extension side or a retraction side of the telescoping cylinder. The method further includes: detecting a threshold pressure differential between the extension side and a retraction side of the lift cylinder, the pressure differential indicative of a load on the tool; providing an electronic signal to a controller when the threshold pressure differential is exceeded; and prohibiting, with the controller, extension of the telescoping cylinder upon receipt of the electronic signal.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
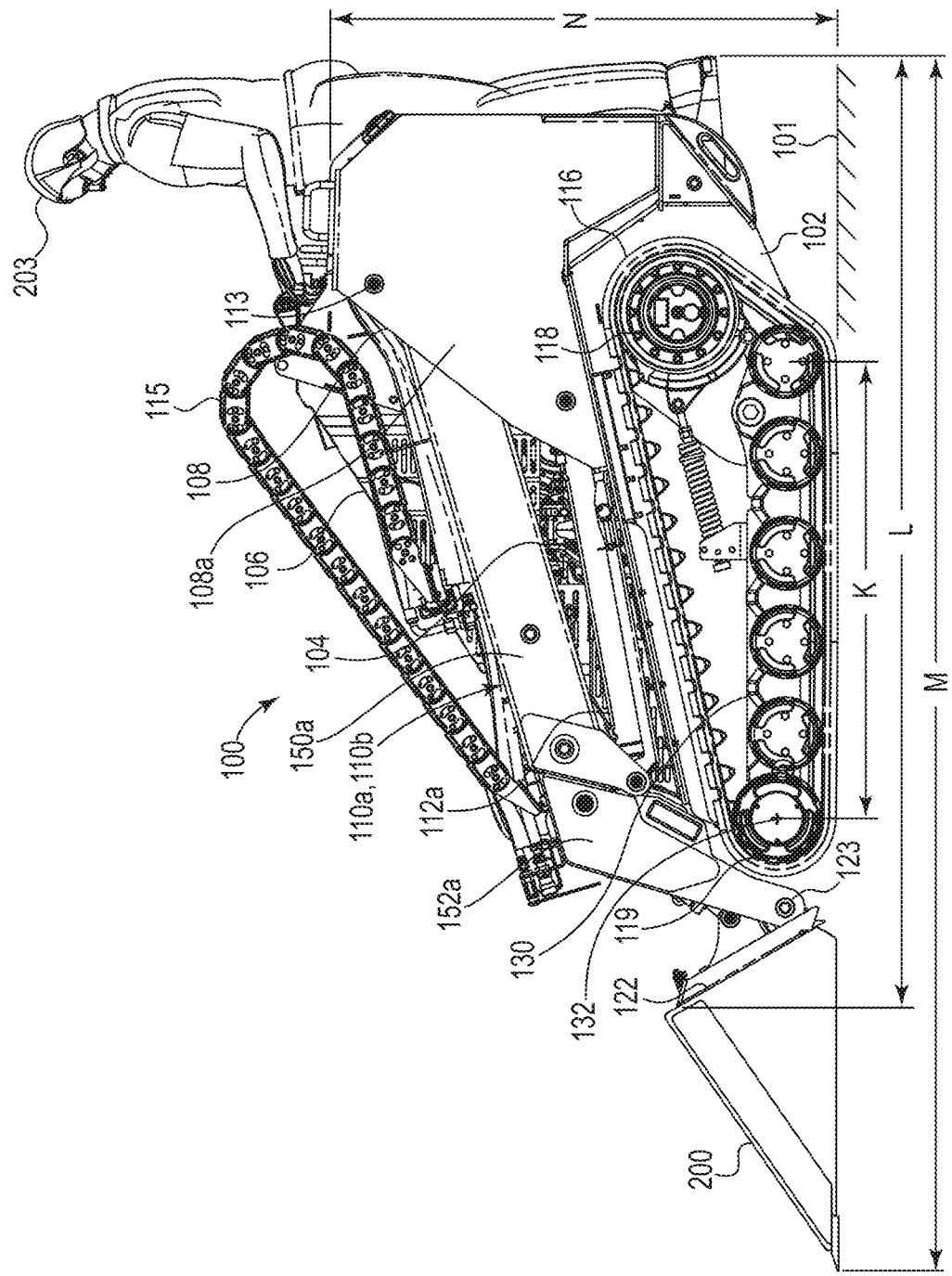
FIG. 1 is a side elevation view of a CUL in accordance with embodiments of the present disclosure, the loader having left and right lift arm assemblies (only left assembly visible) supporting a tool (e.g., bucket) at a minimum or fully lowered position, the lift arm assemblies further shown in a fully retracted position.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings and sub-headings provided herein are for the convenience of the reader and should not be used to limit the meaning of any text that follows the heading or sub-heading unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about." The term "and/or" (if used) means one or all of the listed elements or a combination of any two or more of the listed elements. "I.e." is used as an abbreviation for the Latin phrase id est and means "that is." "E.g." is used as an abbreviation for the Latin phrase exempli gratia and means "for example."

Still further, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating a compact utility loader while the loader is in an operating configuration, e.g., CUL 100 positioned such that tracks 116 rest upon a generally horizontal surface 101 as shown in FIG. 1. These terms are used only to simplify the description, however, and not to limit the interpretation of any embodiment described.

Illustrative embodiments described and illustrated herein are directed to compact utility loaders that may accommodate an operator either: standing upon a platform attached to the loader (e.g., at a rear end of the loader); or optionally, walking behind the loader. In yet other embodiments, the loader may be remotely, autonomously, or semi-autonomously controlled. For brevity, compact utility loaders may be referred to herein as a "CUL" or, more generically, merely as a "loader." Such loaders may include a boom for supporting and operating various attachments or working tools. As further described below, the boom may be formed by one or more lift arm assemblies. The boom may not only pivot relative to a frame of the loader but may also effectively change length (extend and retract) as needed. Such loaders may accordingly provide improved tool reach and elevation as compared with loaders having a fixed arm length.

Furthermore, loaders in accordance with embodiments of the present disclosure may also include a load-sensing system adapted to detect when a moment applied to the loader, e.g., by the tool load, exceeds a predetermined threshold. In such instances, the loader may automatically disable further extension of the boom.

With reference to the figures of the drawing, wherein like reference numerals designate like parts and assemblies throughout the several views, FIGS. 1-4 illustrate a CUL 100 in accordance with embodiments of the present disclosure. The loader 100 may be similar in some respects to the Dingo TXL 2000 compact utility loader sold by The Toro Company of Minneapolis, MN, USA. The loader 100 may accommodate a variety of working tools or attachments used, e.g., by landscape contractors, to perform various tasks. For instance, a bucket 200 may be attached to the loader 100 for scooping, carrying, and emptying (e.g., into a dump truck) dirt or other material. The loader 100 may accommodate other tools including, for example, a vibratory plow, a grapple rake, a trencher, a leveler, a box rake, a soil cultivator, a snowthrower, a stump grinder, a tiller, an auger, a plow blade, and lifting forks, among others. Moreover, loaders intended for indoor operation are also contemplated. For example, embodiments of the present disclosure may include electrically-powered vehicles for use in indoor building demolition and construction, material transport, and the like. As a result, the terms "ground," "surface," "ground surface," "support surface" and the like are used interchangeably herein and refer to any natural or artificial surface upon which the loader may operate (e.g., turf, concrete, flooring, etc.).

While compact utility loaders like those described herein may vary in size, an exemplary loader in accordance with embodiments of the present disclosure may be of a size that permits the loader to access areas generally inaccessible by larger skid steer machines (e.g., areas with confined entries such as gates or doorways, or areas unable to support the weight of a typical skid steer machine). For example, a CUL like that shown in FIG. 1 may have a fore-and-aft, ground engagement contact pad K (e.g., ground/track engagement) of 60 inches or less, an overall length L (without tool) of 110 inches or less, a height N of 80 inches or less, and a maximum width O (see FIG. 3) of 60 inches or less. In one embodiment, the loader 100 of FIG. 1 may have a ground engagement contact pad K of 50 inches, a length L of 103 inches (and a length M of 130 inches with the bucket 200 attached), a height N of 61 inches (corresponding to a height of 67 inches at the top of the carrier 115), and a width O of 54 inches. However, such dimensions are exemplary only and loaders of other sizes are certainly contemplated within the scope of this disclosure.

The exemplary loader 100 may be configured in a stand-on configuration using a platform 202 (see FIG. 3) to accommodate a standing operator 203. In other embodiments, the platform 202 could be stowable so as not to interfere with walk-behind operation. One embodiment of such a stowable platform is shown in U.S. Pat. No. 7,980,569. As stated above, other remote- or autonomously-controlled loader embodiments may forgo the platform and some or all of the controls required for a human operator.

The loader 100 may include a suitably-shaped chassis or frame 102 on which a prime mover, such as an internal combustion engine 104 (or one or more electric motors), is carried. A hood or shroud 106 may at least partially enclose the engine 104. The frame 102 may include laterally spaced uprights 108 (108a, 108b) on each (left and right) side of the loader. The frame 102 may support a boom that includes left and right lift arm assemblies 110 (110a, 110b, see also FIG. 3). The left and right lift arm assemblies 110a, 110b may each include a rear end pivotally connected to the left and right sides or uprights 108a, 108b of the frame, respectively, and extend generally forward of a front end of the loader 100. A lift actuator 112, e.g., linear hydraulic cylinder (only cylinder 112a visible in FIG. 1, but see cylinder 112b in FIG. 3), may be connected between the frame 102 and each respective lift arm assembly 110 (e.g., between the frame 102 and a front end of a rear lift arm 150 as illustrated herein). When piston rods of the lift actuators 112 are extended from their respective cylinder barrels (e.g., when pressurized hydraulic fluid is provided to an extension side of the actuators), the lift actuators are adapted to pivot the lift arm assemblies 110 about a lift arm pivot axis 113 to raise or lift distal (e.g., front) ends of the lift arm assemblies 110 relative to the surface 101/frame 102. Likewise, when the piston rods of the lift actuators 112 are retracted (e.g., when pressurized hydraulic fluid is provided to a retraction side of the actuators), the lift arm assemblies 110 may pivot in the opposite direction about the lift arm pivot axis 113 to lower the distal ends of the arms. While shown with left and right lift arm assemblies, embodiments utilizing only a single lift arm assembly are also contemplated.

The suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposite part/feature (e.g., part/feature identified with a "b" suffix). Similarly, the description of a part/feature identified with no suffix may apply, unless noted otherwise, to both the corresponding left and right part/feature. The phrases "operatively connected," "operatively coupled," "operatively attached," and the like are used to indicate effective coupling of one component, either directly or indirectly, to another component. For purposes of this description, the term "side" (when referring to the vehicle and/or frame) is used, unless noted otherwise, to describe a position to the left or to the right of a longitudinal axis 111 of the loader, e.g., to the left or right of the operator when the operator is standing upon the platform 202. Moreover, the term "end" (when referring to the vehicle and/or frame) is used to refer to positions at or near the longitudinal limits (along the longitudinal axis 111) of the loader (e.g., the "front" and "rear" ends of the vehicle).

In the embodiments described and illustrated herein, the various actuators (e.g., the lift actuators 112, telescoping actuators 154 (described below), and tilt actuators 124 (also described below)) may be configured as linear hydraulic cylinders. However, the term "actuator," as used herein, may refer to most any hydraulic, electric, or pneumatic device capable of providing movement of one element relative to another. For example, a linear pneumatic actuator, or a hydraulic or pneumatic rotary actuator (e.g., driving a pinion in a rack-and-pinion system), could be utilized in place of one or more of the linear hydraulic cylinders. The terms "actuator" and "cylinder" may thus be used interchangeably herein.

The loader 100 may further include a traction system that includes both left and right ground-engaging members operatively attached to the frame that, in some embodiments, are formed by tracks 116 (only left track visible in FIG. 1, with right track being a mirror image) operatively attached to the frame 102. At least one of the members is powered to propel the frame 102 over the surface 101. While shown as tracks, other embodiments may use ground-engaging wheels, rollers, feet, or any other device capable of providing propulsion power to the loader. In one or more embodiments, the loader may include left and right track frames 130 that support the left and right tracks 116, respectively, wherein the track frames may be operatively attached to the frame 102. For example, each track frame may be pivotally attached to the frame 102 such that the frame 102 may pivot (e.g., about a pivot axis 132) during operation relative to the track frame. In other embodiments, the track frame may be rigidly coupled to, or integrally formed with, the frame 102.

With reference still to FIGS. 1-4, each track 116 may be connected to its own independent drive unit (e.g., hydraulic motor) powered by the engine 104 such that the loader may be propelled over the surface 101. In the illustrated embodiments, each track 116 may be configured as an endless, flexible belt that is looped or entrained around a plurality of idlers 119 and a drive wheel 118, the latter being at an elevation above the idlers. Each track 116 may include inwardly extending drive lugs that engage apertures or openings formed in at least the drive wheel 118 so that rotation of the drive wheel 118 results in linear movement of the track 116. In other embodiments, each drive wheel 118 could instead define a sprocket with sprocket teeth operable to engage notches formed in the associated track 116. In fact, most any track configuration now known or later developed is possible without departing from the scope of this disclosure. As stated above, in still other embodiments, the tracks 116 could be replaced with other drive members, e.g., wheels.

As is known in the art, each hydraulic motor may rotate its respective drive wheel 118 in either a forward or reverse direction to permit corresponding propulsion of the loader 100 forwardly (to the left in FIG. 1) or rearwardly (to the right in FIG. 1). As each drive wheel 118 may be powered by its own independent motor, steering control of the loader 100 may be achieved by varying the relative rotational speed and direction of each drive wheel, and thus the speed and direction of each track 116.

The exemplary loader 100 may further include a control console 120 (see FIG. 3) that, in the illustrated embodiment, is located at or near the rear end of the loader 100 (e.g., at or near the rear end of the frame 102) proximate the upper ends of the uprights 108. The control console 120 may include or carry various controls, e.g., levers, switches, buttons, etc., adapted to be manipulated by an operator (e.g., either standing on the platform 202 or walking behind the frame 102) to control loader operation. For example, the control console 120 may include controls that cause various actuators to energize (e.g., cause lift actuators 112 to extend and thus pivot the lift arm assemblies 110 from a lowered position (FIG. 1) through an intermediate elevated position (e.g., see FIG. 2) to a maximum elevated position (see FIG. 3)). In addition, the control console 120 may include a movable drive control handle to allow operator control of the traction system that drives the tracks 116. One exemplary control system that may be adapted for use with embodiments of the present disclosure is described in detail in US Pat. App. Publ. No. 2016-0244937.

As mentioned elsewhere herein, working tools (e.g., such as bucket 200) may be connected to a mounting structure, e.g., attachment plate 122, pivotally connected to front or distal ends of the lift arm assemblies 110. To ease the task of removing and installing tools on the attachment plate 122, various quick attachment systems may be used. Such attachment plates may conform to industry standards such as SAE J2513 (2000).

In some embodiments, the attachment plate 122 is pivotally connected to the front ends of the lift arm assemblies (e.g., at a transverse pivot joint/axis 123) so that an orientation (e.g., angle of inclination) of the attachment plate (and thus the tool itself) may be adjusted as the lift arm assemblies are raised and lowered. Tilt actuators 124 (124a, 124b, see FIG. 3), which may be configured as left and right hydraulic cylinders, may extend between the attachment plate 122 and the lift arm assemblies 110. As the tilt actuators 124 extend and retract, the angle of inclination of the attachment plate (about the pivot axis 123 and relative to lift arm assemblies) may change. Thus, by controlling the vertical position of the lift arm assemblies 110 (via the lift actuators 112), and by controlling the angle of inclination of the attachment plate 122 (via the tilt actuators 124) relative to the lift arm assemblies, the operator may position the tool within a wide range of elevations and inclinations. While shown as utilizing two tilt actuators 124, other embodiments may use a single tilt actuator, or event three or more tilt actuators without departing from the scope of this disclosure.

During operation, the operator may stand upon the platform 202 as shown in the figures (or, in other embodiments, walk behind the frame 102). The control console 120 may be positioned at a convenient height so that it remains accessible to the operator from this standing position. In combination with the forward location of the lift arm pivot axis 113, the CUL 100 may provide the operator with desirable sight lines to both the tool area and the areas immediately surrounding the operator.

Advantageously, loader 100 may use laterally offset (laterally offset to the left and right from a longitudinal axis 111 (see FIG. 3) of the loader/frame) lift arm assemblies (or, as described below, a single, offset lift arm assembly) and an operator position that is generally centered between the left and right lift arm assemblies 110a, 110b. Such a configuration (as well as configurations using a single offset arm as described below) may allow less obstructed visibility of the tool area when compared to, for example, loader configurations utilizing a single, centered arm. Furthermore, offset arms allow the engine 104 to be located at various longitudinal positions between (e.g., lateral to) the lift arm assemblies 110. Such versatility with engine positioning may allow tuning of loader weight distribution/center of gravity characteristics and thus reduce or eliminate additional counter-weights on the vehicle. Visibility may also benefit from positioning the operator 203 (i.e., the operator platform 202) behind (aft of) the lift arm pivot axis 113.

Figure 2:
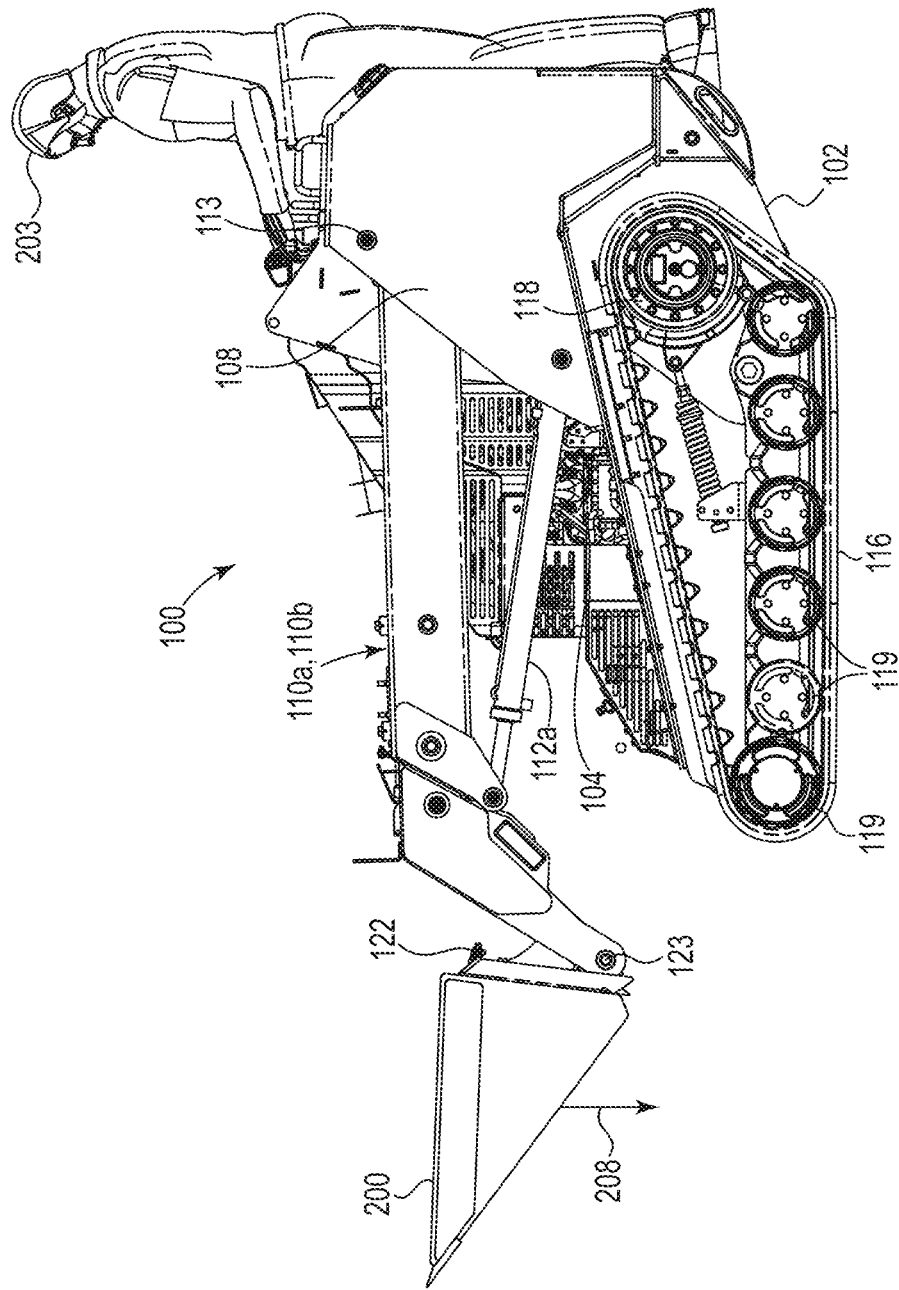
FIG. 2 is a side elevation view of the loader of FIG. 1 (e.g., lift arm assemblies fully retracted), but with the lift arm assemblies lifted to an intermediate elevated position.

With reference again to FIG. 1, the operator may cause the loader 100 to pick up a load of material (e.g., dirt, debris, etc.) with the bucket 200 and then elevate the bucket to an intermediate or transport position as shown in FIG. 2. Movement to the intermediate position of FIG. 2 may be accommodated by a control located on the control console 120 that causes the actuators 112 to extend, thereby raising the bucket 200 to the position shown in FIG. 2. If necessary, the operator may also command the bucket 200 to tip rearwardly by retracting the tilt actuators 124 (see FIG. 3). In some embodiments, the loader may include an electronic controller 190 (see FIG. 5) that could adjust the tilt actuators 124 as the lift actuators 112 are extended to maintain the bucket it a generally constant orientation.

Figure 3:
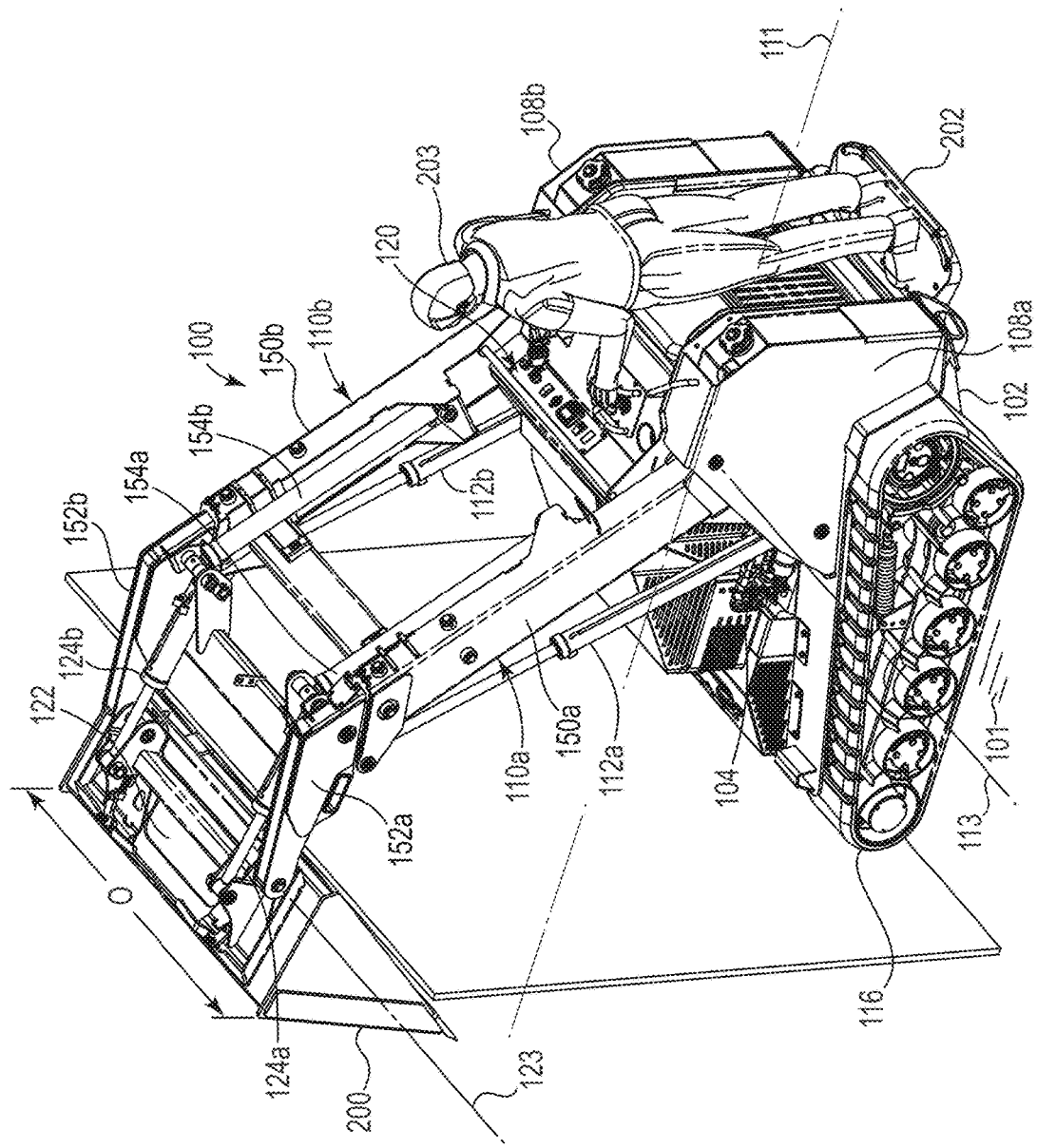
FIG. 3 is a perspective view of the loader of FIG. 1 (e.g., lift arm assemblies fully retracted), but with the lift arm assemblies lifted to a maximum or fully raised position.

As the loader 100 approaches an elevated dump location (e.g., dump truck or other elevated surface), the bucket 200 may be raised to a higher position as shown in FIG. 3 by further extending the lift actuators 112 as shown. To dump the bucket contents, the tilt actuators 124 may be extended.

In order to increase versatility as well as tool lift and reach, loaders in accordance with embodiments of the present disclosure may further provide boom/lift arm assemblies 110 of variable (e.g., extendible) length as described below and illustrated primarily in FIG. 4. That is to say, each lift arm assembly may be operatively attached to the frame and include first (e.g., rear) and second (e.g., front) lift arms telescopically engaged with one another. In the illustrated embodiments, this variable length is achieved by configuring each lift arm assembly (110a, 110b) to include both an elongate rear lift arm 150 (having front and rear ends, wherein the rear end is equivalent to the rear end of the arm assembly) and an elongate front lift arm 152 (also having front and rear ends, wherein the front end is equivalent to the front end of the arm assembly). Each front lift arm 152 (e.g., the rear end of each front lift arm) is telescopically engaged with/received in the rear lift arm 150 (e.g., within the front end of the rear lift arm) such that a distance between the rear end of the rear lift arm and the front end of the front lift arm (e.g., a length of the arm assembly) is variable. Each lift arm assembly (e.g., the rear end of each rear lift arm 150) may be pivotally connected to its respective upright 108 of the frame 102 at the lift arm pivot axis 113. In one embodiment, each rear lift arm 150 forms a tubular member (e.g., a rectangular tube having a greater dimension in the vertical or lift direction), wherein the respective front lift arm 152 (e.g., front lift arms 152a, 152b) may be received therein such that the front lift arm 152 may translate along and within the rear lift arm 150 from a fully retracted position (see, e.g., FIG. 2), to a fully extended position (see, e.g., FIG. 4) or any intermediate position therebetween.

While described as being a tubular member that receives the front lift arm 152 therein, those of skill in the art will realize that the shape of the rear lift arm 150 does not necessarily need to define an enclosed cross section. For example, alternative embodiments of the rear lift arm 150 may form a U- or C-channel in cross section without departing from the scope of this disclosure. In fact, any shape that permits the translation of the front lift arm 152 relative to the rear lift arm 150, while also providing the needed structural integrity to allow the lift arm assemblies 110 to lift a predetermined load when fully extended, is contemplated.

To extend and retract the lift arm assemblies 110a, 110b, each may include a telescoping actuator 154 (154a, 154b, see FIG. 3) adapted to telescopically extend and retract the second or front lift arm 152 relative to the first or rear lift arm 150. In the illustrated embodiment, each telescoping actuator 154 is configured as a linear hydraulic cylinder having a rear (cylinder) end attached to the rear lift arm 150, and a forward (piston rod) end attached to the front lift arm 152. By extending (e.g., providing pressurized hydraulic fluid to a barrel or extension side of) the telescoping actuators 154 in unison, the lift arm assemblies 110 may extend from their fully retracted positions shown in FIGS. 1-2, to their fully extended positions shown in FIG. 4. In the illustrated embodiments, the lift arm assemblies may extend by a distance J of 30-35 inches (e.g., 31 inches). By allowing the lift arm assemblies 110 to extend from the length provided in the retracted position, the reach and lift height of the loader 100 may be increased accordingly. As with the lift actuators 112, the two telescoping actuators 154 may be hydraulically connected in parallel (e.g., extension side of actuator 154a is connected to extension side of actuator 154b, while a retraction side of actuator 154a is connected to a retraction side of actuator 154b) so that each actuator receives equal pressure during actuation (see FIG. 5).

In one or more embodiments, one or both of the lift arm assemblies 110 may include at least one carrier 115 (shown only in FIG. 1) extending between the rear and front lift arms 150, 152. The carrier 115 may be configured to guide and restrain cables, wires, hoses, etc. extending between the rear lift arms 150/frame 102 and the front lift arms 152 as the lift arm assemblies 110 move between their fully retracted positions and their fully extended positions. Moreover, in some embodiments, the lift arm assemblies, e.g., either or both of the front lift arms 152, may include indicia 153 (e.g., decals or other visible markings as shown in FIG. 4) along one or both of an inner- and outer-facing side. Such indicia 153 may be visible when the front lift arm 152 is partially (or fully) extended. Accordingly, the visibility of such indicia 153 may indicate to the operator that the lift arm assemblies are not in their fully retracted positions. In some embodiments, the indicia may include graduations (e.g., ruler markings) that indicate to the operator the degree to which the lift arm assemblies are extended from their retracted positions.

Loaders in accordance with embodiments of the present disclosure may utilize dual lift arm assemblies (e.g., left and right) with corresponding dual actuators. For instance, the loader 100 may include left and right lift actuators 112, left and right tilt actuators 124, and left and right telescoping actuators 154. Such a dual configuration may, as stated above, provide various benefits including better visibility of the tool area, e.g., along a centerline viewing lane of the loader 100 (as opposed to configurations using a single, centrally-mounted arm assembly/actuator). Moreover, as stated above, each actuator may be hydraulically connected in parallel to its corresponding actuator (e.g., lift actuator 112a is hydraulically connected in parallel to lift actuator 112b) so that each actuator of each pair receives equal pressure during actuation. In other embodiments, the loader 100 could accommodate the various arm assembly movements using a single lift actuator 112, a single tilt actuator 124, and/or a single telescoping actuator 154.

While described herein above in the context of a bucket 200 and the desire to increase the lift height of the same, other tools may also benefit from the increased reach provided by the exemplary loader 100. For instance, a fork lift may also benefit from lift arm extension.

Figure 5:
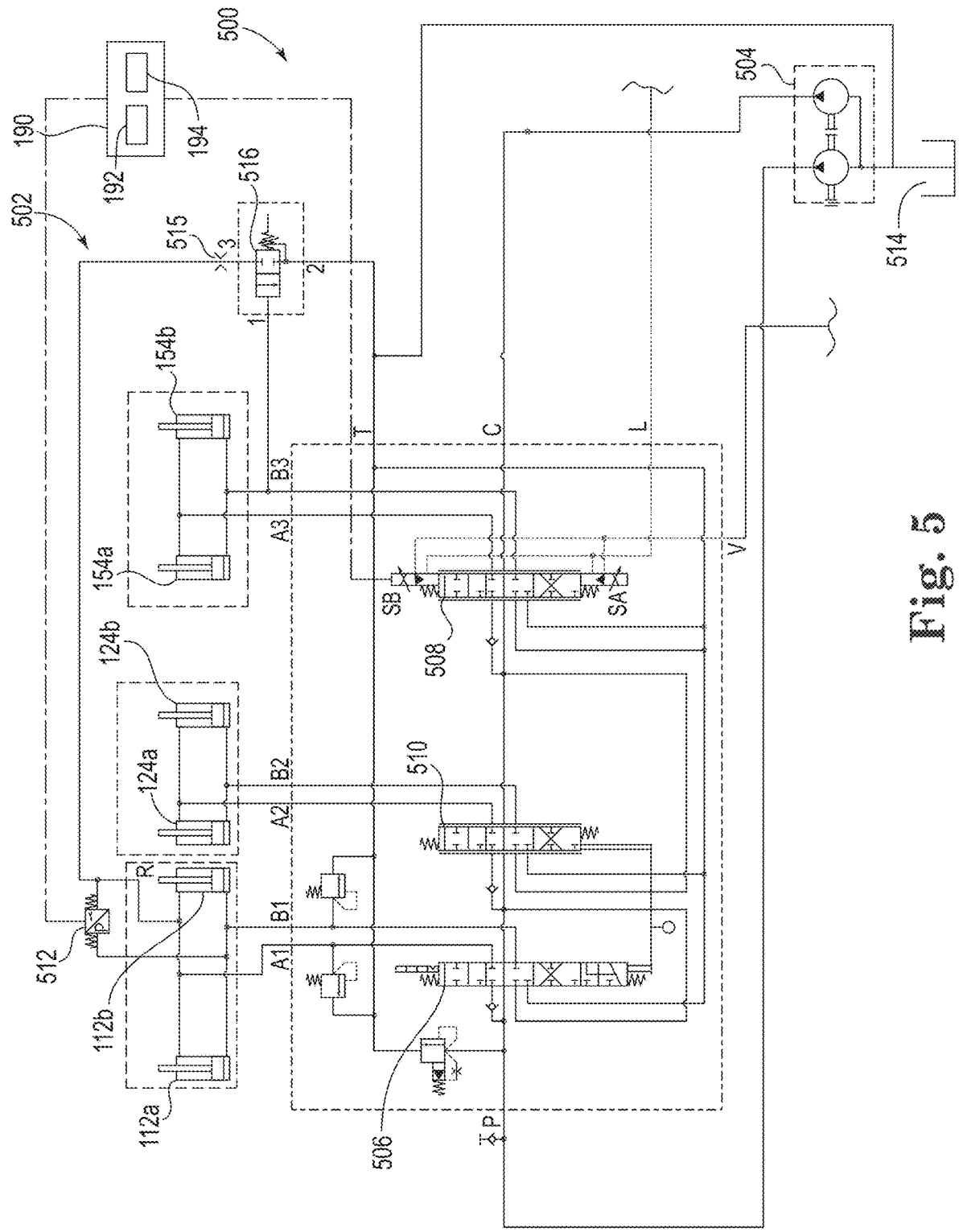
FIG. 5 is an exemplary hydraulic circuit for a CUL illustrating a load-sensing system in accordance with embodiments of the present disclosure.

In some embodiments, the loader may be configured as a drive-by-wire vehicle in which some or all operator inputs are provided as electronic signals to an electronic controller (see, e.g., controller 190 in FIG. 5). The controller may then apply pre-programmed logic and generate output commands to the various actuators in response thereto. For instance, upon receiving a boom extend command, the controller may evaluate the status of various interlocks, as well as any information regarding tool load. If any information is determined to be out of bounds, the controller may prevent extension or otherwise limit telescoping accordingly. If the controller determines that all parameters are within bounds, it may issue an "open" command to the hydraulic valve that extends the telescoping actuators. In other embodiments, the controls may be entirely manual (e.g., pilot-controlled) or a combination of manual and electronic control. For instance, in one embodiment, the traction (propulsion) control and arm assembly extension/retraction may be electronically controlled, while tool lift and curl (tilt) are manually controlled.

As shown in FIG. 5, the controller 190 may include a processor 192 that receives various inputs and executes one or more computer programs or applications stored in memory 194. The memory 194 may include computer-readable instructions or applications that, when executed, e.g., by the processor 192, cause the controller 190 to perform various calculations and/or issue commands. That is to say, the processor 192 and memory 194 may together define a computing apparatus operable to process input data and generate the desired output to one or more components/devices.

It will be readily apparent that the functionality of the controller 190 may be implemented in any manner known to one skilled in the art. For instance, the memory 194 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 190, the memory 194 and the processor 192 could be contained in separate modules.

The processor 192 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 192 may include multiple components, such as any combination of one or more microprocessors, one or more controllers, one or more DSPs, one or more ASICs, and/or one or more FPGAs, as well as other discrete or integrated logic circuitry. The functions attributed to the controller 190 and/or processor 192 herein may be embodied as software, firmware, hardware, or any combination of these.

Figure 4:
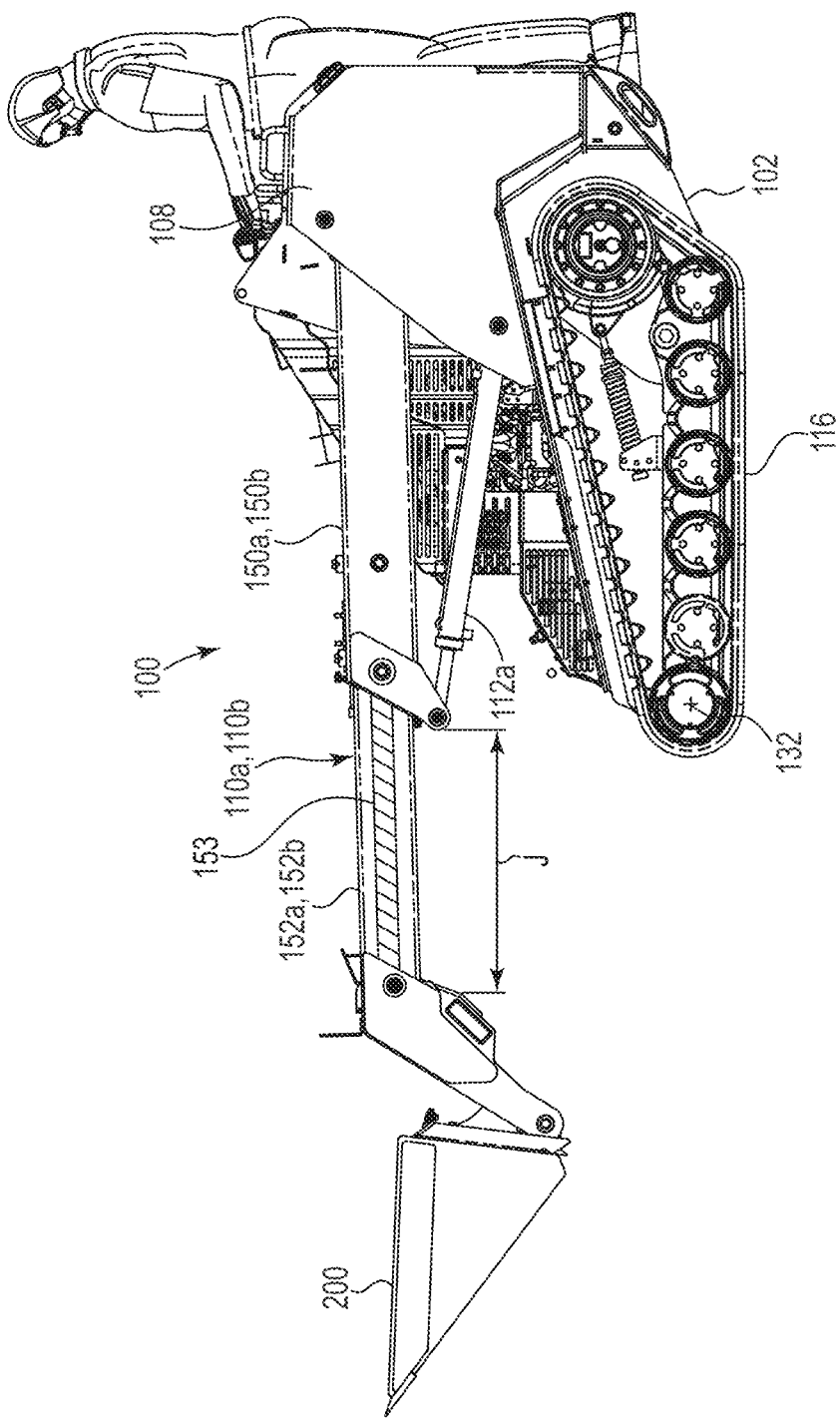
FIG. 4 is a side elevation view similar to FIG. 2 (e.g., lift arm assemblies at an intermediate elevated position), but with the lift arm assemblies in a fully extended position.

As one of skill may recognize, the extension of the lift arm assemblies 110 from the retracted position of FIGS. 1-2 to the extended position of FIG. 4 increases the moment on the loader 100, and thus may correspondingly decrease the magnitude of the load that may be satisfactorily lifted. For instance, in the illustrated tracked embodiment, increasing the lift arm assembly length by the distance J (see FIG. 4) of 31 inches could decrease the rated operating capacity (ROC) of the loader 100 from 2000 pounds to 1000 pounds (assuming additional counterweights or the like are not utilized on the loader when the arm assemblies are in the extended position).

To automatically prohibit extension of the lift arm assemblies when the tool load 208 (see FIG. 2) is above a predetermined threshold, embodiments of the loader 100 may include a load-sensing system. Such a load-sensing system may be adapted to detect when the load 208 applied to/carried by the working tool (e.g., bucket 200) is sufficient to cause a moment at the frame 102 that exceeds a predetermined threshold moment. Based upon this detection, the loader may disable extension (limit further extension) of the lift arm assemblies 110 (e.g., limit the extension of the telescoping actuators 154). In addition, the loader 100 may be configured to provide an alert at or before reaching this threshold. Such an alert may include most any suitable indicator. For example, a visual alert may be provided that indicates the moment is approaching a threshold that could result in a weight shift from the rear of the loader 100 toward the front. Such an alert may be located at any suitable position on the loader 100, e.g., on the control console 120. While described as a visual alert, such a configuration is not limiting as other embodiments may alternatively or additionally include audible sounds, other visual markers, vibrations, etc. Moreover, in parallel with the alert, the loader (e.g., controller) may initiate other actions as described below.

FIG. 5 is a partial schematic of an exemplary hydraulic circuit 500 of the CUL 100 illustrating a load-sensing system 502 in accordance with embodiments of the present disclosure. As shown in this view, a hydraulic pump assembly 504 (e.g., including one or more fixed displacement pumps powered by the engine 104) may provide pressurized hydraulic fluid to various hydraulic components (e.g., to the lift actuators 112, telescoping actuators 154, tilt actuators 124, as well as the drive wheel 118/propulsion system (the latter not illustrated in FIG. 5)). A lift directional control valve 506—responsive to manipulation of associated controls provided on the control console 120 (see FIG. 3)—may be adapted to control flow of hydraulic fluid to the extension and retraction sides of the lift actuators 112 (e.g., by directing pressurized hydraulic flow to the appropriate side and porting fluid on the other side to hydraulic return), while a tilt directional control valve 510 controls the tilt actuators 124 in a similar manner. Further, an electronically-controlled (e.g., by the controller 190) telescoping directional control valve 508 may be adapted to control flow of hydraulic fluid to the extension and retraction sides of the telescoping actuators 154.

In FIG. 5, schematic connections are generally shown between the controller 190 and various components of the loader 100. These interconnections are illustrative only as the various subsystems of the CUL 100 could be connected in most any manner, e.g., directly to one another, wirelessly, via a bus architecture (e.g., controller area network (CAN) bus), or any other connection configuration that permits data and/or power to pass between the various components of the CUL. Although all connections are not illustrated in FIG. 5, one of skill in the art will understand that other various electrical, hydraulic, and mechanical interconnections may be provided.

The exemplary load sensing system 502 shown in FIG. 5 may include a differential pressure switch 512 associated with the lift actuators 112 and adapted to detect a threshold differential pressure between the extension side and the retraction side of the lift actuators (wherein again, the extension sides of the actuators are connected in parallel, as are the retraction sides). The controller 190 may be in communication with both the pressure switch 512 and the telescoping directional control valve 508 associated with the telescoping cylinders 154. As described herein, the controller may be adapted to prohibit extension of the telescoping cylinders when the differential pressure switch detects the threshold differential pressure. More specifically, the controller 190 may be adapted to receive a signal from the pressure switch 512 upon detection of the threshold differential pressure and electronically disable extension of the telescoping actuators 154 via the valve 508.

The actual threshold ("tripping") differential pressure may be selected based upon various factors including the size, geometry, and configuration of the loader 100. In practice, the tripping pressure of the switch 512 is preferably set to a value that corresponds to a tool load 208 (assuming negligible pressure on the retraction side of the lift actuators 112) above which could result in undesirable loader dynamics if the lift arm assemblies are extended from their retracted position.

In use, the operator may, after securing a tool load (e.g., loading the bucket 200), lift the tool using the appropriate control to extend the lift actuators 112. As the lift actuators extend, fluid on the retraction side of the lift actuators 112 is returned to tank 514 via the valve 506. As a result, the differential pressure detected by the switch 512 may be generally equivalent to the pressure on the extension side of the actuators 112. If that differential pressure is at or above the threshold differential pressure, the switch 512 may trip and provide a signal ("trip signal") to the controller 190. Upon receipt of the trip signal, the controller 190 may electronically prohibit extension of the telescoping actuators 154. In some embodiments, the controller is configured only to prohibit extension of the lift arm assemblies while not interfering with retraction of the same. As a result, lift arm extension may be prohibited in circumstances wherein tool load may be of a magnitude that could negatively affect loader performance upon lift arm extension.

While the pressure switch 512 provides the trip signal to prohibit further extension of the telescoping actuators 154, various factors may result in the switch not tripping under the appropriate tool load. Such an occurrence may occur when pressurized hydraulic fluid becomes "trapped" on the retraction side of the lift cylinders 112. Such pressure may result, for example, from aggressive manipulation of the lift cylinder controls/valves and/or simultaneous operation of other machine hydraulic functions during lift cylinder movement. Under such circumstances, the pressure switch 512 may be subject to a pressure differential that does not accurately reflect the actual tool load.

An erroneous pressure differential detected by the switch 512 does not, in the illustrated embodiments, impact normal extension and retraction of the lift and tilt cylinders, nor retraction of the telescoping actuators. However, such an occurrence may affect extension of the telescoping actuators as it may allow the arm assemblies to extend when the actual tool load is above a load threshold.

To address this issue, the system 502 may include a pilot-operated sequence valve 516 connected to the retraction side of the lift actuators 112 as shown in FIG. 5. In some embodiments, the sequence valve 516 is configured as a two-position valve that is normally closed (first position) as shown in FIG. 5. While the sequence valve 516—when in this first position—is effective at isolating hydraulic fluid in the retraction side of the lift cylinders 112 (and thus the switch 512) from dynamic downstream hydraulic influences and other hydraulic components, it does not alleviate the trapped pressure issue. Thus, the sequence valve 516 may include a second or "bleed" position in which the trapped hydraulic fluid in the retraction side of the lift actuators is directed or "bled" to hydraulic return (to tank 514). For example, during operation, the sequence valve 516 may move or shift from the first position to the second position when pressurized hydraulic fluid is provided to the extension side of the telescoping actuators 154 (e.g., when the valve 508 is commanded to extend the telescoping actuators 154). When this occurs, pilot pressure is also provided to the sequence valve 516 as indicated in FIG. 5. Upon pilot pressure activation, the sequence valve may shift to the second position and bleed the retraction side of the lift actuators 112 across an orifice restriction 515 adapted to limit flow of hydraulic fluid to hydraulic return (to tank 514). Once this occurs, the pressure differential detected by the switch 512 may again reflect the actual pressure in the extension side of the lift actuators and, therefore, accurately trip at the desired, predetermined threshold pressure. Again, should the switch 512 trip at this point, the controller 190 may prevent extension (or further extension) of the telescoping actuators 154.

While the actual size of the orifice restriction 515 may vary, it is preferably configured to meter fluid at a reduced or controlled rate rather than provide the hydraulic fluid with an unimpeded path to hydraulic return.

Accordingly, an exemplary method of operating a CUL includes: lifting a tool attached to a lift arm assembly from a first elevation to a second elevation by providing pressurized hydraulic fluid to an extension side of a lift cylinder. The lift arm assembly includes first and second lift arms telescopically engaged with one another, wherein a telescoping cylinder is adapted to adjust the length of the lift arm assembly by directing pressurized hydraulic fluid to either an extension side or a retraction side of the telescoping cylinder. The method also includes detecting a threshold pressure differential between the extension side and a retraction side of the lift cylinder, wherein the pressure differential is indicative of a load on the tool. The method also includes: providing an electronic signal to a controller when the threshold pressure differential is exceeded; and prohibiting, with the controller, extension of the telescoping cylinder upon receipt of the electronic signal. In other embodiments, The method may further include prohibiting flow of hydraulic fluid from the retraction side of the lift cylinder, and/or directing flow of hydraulic fluid from the retraction side of the lift cylinder to hydraulic return upon extension of the telescoping cylinder.

Figure 6:
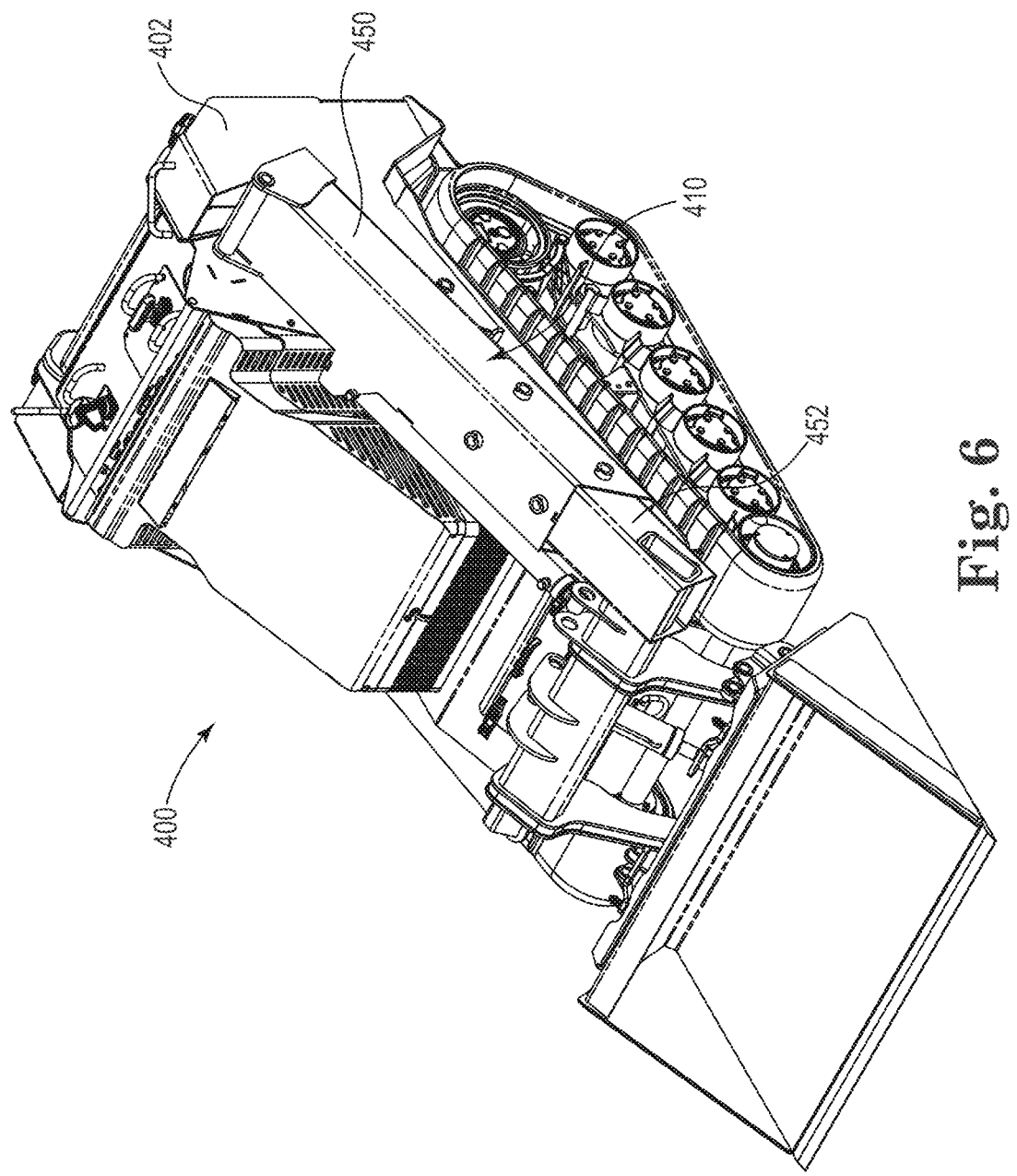
FIG. 6 is a perspective view of a CUL in accordance with alternative embodiments of this disclosure, wherein the loader includes a single, offset lift arm assembly.

While described herein as utilizing two (left and right) lift arm assemblies, other embodiments may achieve the desired lift and reach using a single, e.g., laterally offset, lift arm assembly. Such an arm assembly could be attached to either the left or right side of the loader (e.g., similar to using only one of the arm assemblies illustrated herein). For example, as shown in FIG. 6, a loader 400 is shown that includes a lift arm assembly 410 that may be attached to a frame 402 on the left side of the loader 400. The offset position of the lift arm assembly 410 may, as with the dual arm loader 100 described above, allow the operator of the loader 400 to maintain visibility of the tool area through the center of the loader 400. The lift arm assembly 410 may include an elongate rear lift arm 450 pivotally attached to the frame 402 and an elongate front lift arm 452 that may be telescopically received in the rear lift arm 450 in a manner similar to that already described herein in the context of the loader 100. For example, a rear end of the front lift arm 452 may be telescopically received in a front end of the rear lift arm 450 such that a distance between a rear end of the rear lift arm 450 and a front end of the front lift arm 452 may be varied.

The loader 400 may also include any of the features already identified and described herein in accordance with the embodiments of FIGS. 1-5.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A compact utility loader comprising:
   a frame;
   ground-engaging members operatively attached to the frame, wherein at least one of the ground-engaging members is powered to propel the frame over a surface;
   a lift arm assembly operatively attached to the frame, wherein the lift arm assembly comprises first and second lift arms telescopically engaged with one another, and wherein the lift arm assembly is pivotally attached to the frame at a lift arm pivot axis;
   a hydraulic lift actuator adapted to pivot the lift arm assembly about the lift arm pivot axis, the lift actuator comprising an extension side and a retraction side;
   a hydraulic telescoping actuator adapted to telescopically extend and retract the second lift arm relative to the first lift arm, wherein the telescoping actuator also comprises an extension side and a retraction side; and
   a differential pressure switch associated with the lift actuator and adapted to detect a threshold differential pressure between the extension side and the retraction side of the lift actuator.

2. The loader of claim 1, further comprising an electronic controller adapted to receive a signal from the pressure switch upon detection of the threshold differential pressure.

3. The loader of claim 1, further comprising a sequence valve connected to the retraction side of the lift actuator, wherein the sequence valve comprises a first position in which hydraulic fluid in the retraction side of the lift actuator is isolated from other hydraulic components of the loader.

4. The loader of claim 3, wherein the sequence valve comprises a second position in which the hydraulic fluid in the retraction side of the lift actuator is directed to hydraulic return.

5. The loader of claim 4, wherein the sequence valve is adapted to move from the first position to the second position when pressurized hydraulic fluid is provided to the extension side of the telescoping actuator.

6. The loader of claim 4, further comprising an orifice restriction associated with the sequence valve, the restriction adapted to limit flow of the hydraulic fluid to hydraulic return.

7. The loader of claim 1, further comprising a lift directional control valve adapted to control flow of hydraulic fluid to the extension and retraction sides of the lift actuator.

8. The loader of claim 1, further comprising a telescoping directional control valve adapted to control flow of hydraulic fluid to the extension and retraction sides of the telescoping actuator.

9. A compact utility loader comprising:
a frame;
ground-engaging members operatively attached to the frame, wherein at least one of the ground-engaging members is powered to propel the frame over a surface;
a control console located at or near a rear end of the frame, the control console carrying controls adapted to be manipulated by an operator either: standing on a platform mounted near the rear end of the frame; or walking behind the frame;
a lift arm assembly attached to at least one of a first and second side of the frame, wherein the lift arm assembly comprises:
an elongate rear lift arm including a front end and a rear end, wherein the rear end of the rear lift arm is pivotally attached to the frame at a lift arm pivot axis; and
an elongate front lift arm also including a front end and a rear end, wherein the rear end of the front lift arm is telescopically received in the front end of the rear lift arm such that a distance between the rear end of the rear lift arm and the front end of the front lift arm is variable;
a hydraulic lift cylinder adapted to pivot the lift arm assembly about the lift arm pivot axis, the lift cylinder comprising an extension side and a retraction side;
a hydraulic telescoping cylinder adapted to telescopically extend and retract the front lift arm relative to the rear lift arm; and
a differential pressure switch associated with the lift cylinder and adapted to detect a threshold differential pressure between the extension side and the retraction side of the lift cylinder.

10. The loader of claim 9, further comprising a controller in communication with both the pressure switch and a directional control valve associated with the telescoping cylinder, wherein the controller is adapted to prohibit extension of the telescoping cylinder when the differential pressure switch detects the threshold differential pressure.

11. A compact utility loader comprising:
a frame;
ground-engaging members operatively attached to the frame, wherein at least one of the ground-engaging members is powered to propel the frame over a surface;
a lift arm assembly operatively attached to the frame, wherein the lift arm assembly comprises first and second lift arms telescopically engaged with one another, and wherein the lift arm assembly is pivotally attached to the frame at a lift arm pivot axis;
a hydraulic lift cylinder adapted to pivot the lift arm assembly about the lift arm pivot axis, the lift cylinder comprising an extension side and a retraction side;
a hydraulic telescoping cylinder adapted to telescopically extend and retract a front lift arm relative to a rear lift arm, wherein the telescoping cylinder also comprises an extension side and a retraction side;
a differential pressure switch associated with the lift cylinder and adapted to detect a threshold differential pressure between the extension side and the retraction side of the lift cylinder; and
a sequence valve connected to the retraction side of the lift cylinder, wherein the sequence valve comprises a first position in which hydraulic fluid in the retraction side of the lift cylinder is isolated from other hydraulic components of the loader.

12. The loader of claim 11, further comprising a hydraulic pump adapted to provide pressurized hydraulic fluid to the lift cylinder and the telescoping cylinder.

13. The loader of claim 11, wherein the sequence valve comprises a second position in which the hydraulic fluid in the retraction side of the lift cylinder flows to hydraulic return.

14. The loader of claim 13, wherein the sequence valve is adapted to move from the first position to the second position when pressurized hydraulic fluid is provided to the extension side of the telescoping cylinder.

* * * * *